(12) United States Patent
Ruan

(10) Patent No.: US 8,181,928 B2
(45) Date of Patent: May 22, 2012

(54) DEVICE FOR FIXING ROD-LIKE APPARATUS

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 319 days.

(21) Appl. No.: 12/481,544

(22) Filed: Jun. 9, 2009

(65) Prior Publication Data
US 2010/0230574 A1    Sep. 16, 2010

(30) Foreign Application Priority Data

Mar. 12, 2009   (CN) .......................... 2009 1 0096665

(51) Int. Cl.
*F16M 1/00* (2006.01)
(52) U.S. Cl. .................... 248/316.1; 248/316.8; 248/65; 248/251; 248/222.11
(58) Field of Classification Search .......... 248/316.1, 248/316.3, 316, 5, 316.8, 222.11, 231.51, 248/540, 541, 251, 65, 68.1
See application file for complete search history.

(56) References Cited

U.S. PATENT DOCUMENTS

| | | | | |
|---|---|---|---|---|
| 4,541,602 A | * | 9/1985 | Potzas | 248/544 |
| 5,464,179 A | * | 11/1995 | Ruckwardt | 248/68.1 |
| 5,988,579 A | * | 11/1999 | Moner et al. | 248/311.2 |
| 6,749,167 B2 | * | 6/2004 | Kaupp et al. | 248/311.2 |
| 7,380,762 B2 | * | 6/2008 | Takeichi | 248/311.2 |
| 7,597,300 B2 | * | 10/2009 | Harada | 248/311.2 |
| 7,866,620 B2 | * | 1/2011 | Kaemmer | 248/311.2 |
| 2003/0136891 A1 | * | 7/2003 | Thullen et al. | 248/316.5 |

FOREIGN PATENT DOCUMENTS

CN       201027731 Y     2/2008

* cited by examiner

*Primary Examiner* — Terrell McKinnon
*Assistant Examiner* — Steven Marsh
(74) *Attorney, Agent, or Firm* — Minder Law Group; Willy H. Wong

(57) ABSTRACT

The present invention discloses a device for fixing a rod-like apparatus in the field of mechanics. The existing problems of the device for fixing the rod-like apparatus, such as infirm fixation and low reliability, are addressed by using the device of the invention. The fixing device of the invention includes a body having a cavity in the interior. One or more notches having recessions are provided on the body. The notches have one or more holding pawls which could be opened and closed at the ends thereof. One or more positioning mechanisms are further provided in the body which could lock the holding pawls, in particular, lock the holding pawls when the notches of the body are closed by the holding pawls. The device of the invention could provide the benefits such as firm fixation, high reliability, an orderly and aesthetic appearance and relatively high practical value.

9 Claims, 5 Drawing Sheets

DEVICE FOR FIXING ROD-LIKE APPARATUS

BACKGROUND OF THE INVENTION

1. Field of Invention

The present invention relates to a fixing device in the field of mechanics, in particular, to a device for fixing a rod-like apparatus.

2. Related Art

The rod-like instrument includes goods supporting means. The goods supporting means are rod-shaped and used to fix the goods to prevent the goods falling off or displacing during transportation. Hence, the goods supporting means are widely applied in the field of logistics.

However, a large number of goods supporting means are required during goods transportation. The goods supporting means could be damaged or distorted without proper storage due to the rod shape thereof. Apparently, the storage of the goods supporting means has become a problem to be solved in this area.

In order to reduce the distortion of the goods supporting means, they are generally vertically disposed. Nevertheless, no addition devices are used to position the goods supporting means during vertical disposition, making the goods supporting means tend to fall off. Therefore, the goods supporting means could not be efficiently stored.

In order to address the above problems, various kinds of fixing devices are designed. For example, Chinese Patent CN201027731Y discloses a device for fixing a rod-like apparatus comprising a fixing mechanism, a locking mechanism and a stiffener, in which the fixing mechanism is cylindrical, the locking mechanism is formed of a vaulted hook and flexible, and the fixing mechanism is integrated with the locking mechanism via the stiffener into a piece. When the fixing device is used, it is positioned on the bedplate or crosspiece thought the locking mechanism, and then the rod-like apparatus is hitched by a cylindrical mechanism at the fixing mechanism, so that the hitched rod-like apparatus would not be detached from the fixing device.

Although the rod-like apparatus could be firmly fixed by the aforementioned fixing device, the rod-like apparatus is inserted into the fixing mechanism or hitched by the fixing mechanism during the fixing process. When rod-like apparatus is relatively long, the fixing device is not so convenient for positioning the rod-like apparatus. On the other hand, the rod-like apparatus could not be conveniently removed from the fixing device either.

The other existing devices for fixing rod-like apparatus have the same problems as those for the goods supporting means have now.

SUMMARY OF THE INVENTION

One object of the invention is to provide a device for fixing one or more rod-like apparatus for conveniently positioning a rod-like apparatus with a relatively high fixing device.

The object of the invention is accomplished by the device for fixing one or more rod-like apparatus comprising a body having a cavity in the interior, characterized in that, one or more notches having recessions are provided on the body, the notches have one or more corresponding holding pawls which could be opened and closed at the ends thereof, one or more positioning mechanisms are further provided in the body which could lock the holding pawls, in particular, lock the holding pawls when the notches of the body are closed by the holding pawls.

The device for fixing the rod-like apparatus is mounted on the wall for fixing one or more rod-like goods supporting means. In particular, the holding pawls of the device do not close the access ends of the notches in the initial state. The rod parts of the goods supporting means could be inserted into the notches. The holding pawls close the access ends of the notches once the goods supporting means are inserted into the notches. Meanwhile, the positioning mechanisms lock the holding pawls, in which case the holding pawls keep closing the access ends of the notches.

The good supporting means at the notches are locked all the while, which makes the good supporting means not be detached from the notches of the body.

According to the device for fixing the rod-like apparatus of the invention, the holding pawls are arc-shaped and hinged to the body at the middle portion thereof. The inner ends of the holding pawls are located at the bottoms of the notches, while the outer ends of the holding pawls are located on the side of the access ends of the notches. When the rod-like apparatus such as the rod parts of the goods supporting means are inserted into the notches, the rod parts of the goods supporting means will press the inner ends of the holding pawls, so that the holding pawls will swing around the hinged parts. That is to say, the inner ends of the holding pawls are swung to the bottoms of the notches, and the outer ends of the holding pawls are swung to the access ends of the notches. The access ends of the notches of the body are closed by the outer ends of the swung holding pawls.

According to the device for fixing the rod-like apparatus of the invention, the positioning mechanisms include one or more first springs and baffles movable in the body. Both ends of the first springs are pressed against the holding pawls and the body respectively. The inner ends of the holding pawls are located on the upper portion of the baffles with the elasticity of the first springs.

The rod-like apparatus are pressed against the holding pawls. The holding pawls bring the baffles to move therewith after the elasticity of the first springs is overcome. The baffles are reset to the initial position once the inner ends of the holding pawls are swung to the lower portion of the baffles. The inner ends of the holding pawls are always pressed against the lower portion of the baffles with the baffles and first springs.

According to the device for fixing the rod-like apparatus of the invention, the positioning mechanisms further include one or more corresponding second springs provided between the baffles and the body. The baffles partially extend to the notches with the elasticity of the second springs.

The baffles will move once they are under force to overcome the elasticity of the second springs. The baffles would be reset to the initial position with the elasticity of the second springs once the external force on them is removed.

According to the device for fixing the rod-like apparatus of the invention, a guide element is located in the body. The baffles are connected to the guide element and could move along the guide element. Both ends of the second springs are acted against the guide element and the baffles respectively.

The baffles extend out with the elasticity of the second springs. That is to say, the baffles are partly located at the bottoms of the notches. The baffles could draw back by overcoming the elasticity of the second springs. The baffles would be reset to the initial position with the second springs once there is no external force on the outer ends of the baffles.

As an alternative, in the device for fixing the rod-like apparatus of the invention, the body has one or more corresponding positioning pieces positioned therein the lower parts of which are hinged to one end of the baffles, and both ends of the second springs are acted against the positioning pieces and the baffles respectively.

Apparently, the baffles could swing around the hinged parts under the positioning pieces. That is to say, the inner ends of the holding pawls could overcome the elasticity of the second springs after pressing the baffles, so as to make the baffles swing downward around the hinged parts. The inner ends of the holding pawls are detached from the baffles when the holding pawls are swung to a certain extent. In this case, the baffles are reset with the second springs. The inner ends of the holding pawls are always pressed against the lower parts of the baffles with the first springs.

According to the device for fixing the rod-like apparatus of the invention, the baffles have one or more projected plugs thereon. An open guide element is provided in the body. An open piece is provided at the open guide element to move along it. The open piece has inclined extrusion faces which are in contact with the plugs.

When the rod-like apparatus inserted at the notches of the body need be removed, the open piece is pushed to move along the open guide element, so that the plugs are pushed by the open piece via the extrusion faces thereon. The plugs are fixedly connected to the baffles, bringing the baffles to draw back. Therefore, the holding pawls could be swung to keep the notches of the body open. This way, the rod-like apparatus could be conveniently removed from the notches of the body.

According to the device for fixing the rod-like apparatus of the invention, two notches are provided on the body. Each of the notches has a holding pawl and a positioning mechanism, in which the holding pawls and the positioning mechanism are symmetrically disposed.

Evidently, two rod-like apparatus could be positioned by said one fixing device.

According to the device for fixing the rod-like apparatus of the invention, the open piece is Y-shaped. Both inner ends of the Y-shaped open piece are in contact with the plugs on the baffles respectively.

Two baffles could be drawn back by said one open piece.

According to the device for fixing the rod-like apparatus of the invention, a housing made of plastics is located outside the body to provide a compact configuration.

According to the device for fixing the rod-like apparatus of the invention, a locking bar is further provided on the body. The inner end of the locking bar is positioned between said two baffles. The locking bar has projected raised heads at the inner end thereof. The outer end of the locking bar extends out of the housing. The baffles could be blocked by the raised heads, that is to say, the baffles are pressed against the raised heads when the locking bar is rotated, so that the baffles are always kept in the extended state.

The locking bar must be rotated to detach the raised heads from the baffles when the baffles need be drawn back.

Compared with the prior art, according to the device for fixing the rod-like apparatus of the invention, the rod-like apparatus only need be inserted in the notches of the body, in which case the rod-like apparatus could be fixed by the holding pawls and the positioning mechanisms. Meanwhile, the access ends of the notches are always closed by the holding pawls after the rod-like apparatus are inserted into the notches of the body. This way, the fixing device could not only firmly fix the rod-like apparatus, but also improve the fixing reliability.

Moreover, the locking instrument on the body further enhances the security of the fixing device. Furthermore, the housing set outside the body provides an orderly and aesthetic appearance and relatively high practical value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 1:
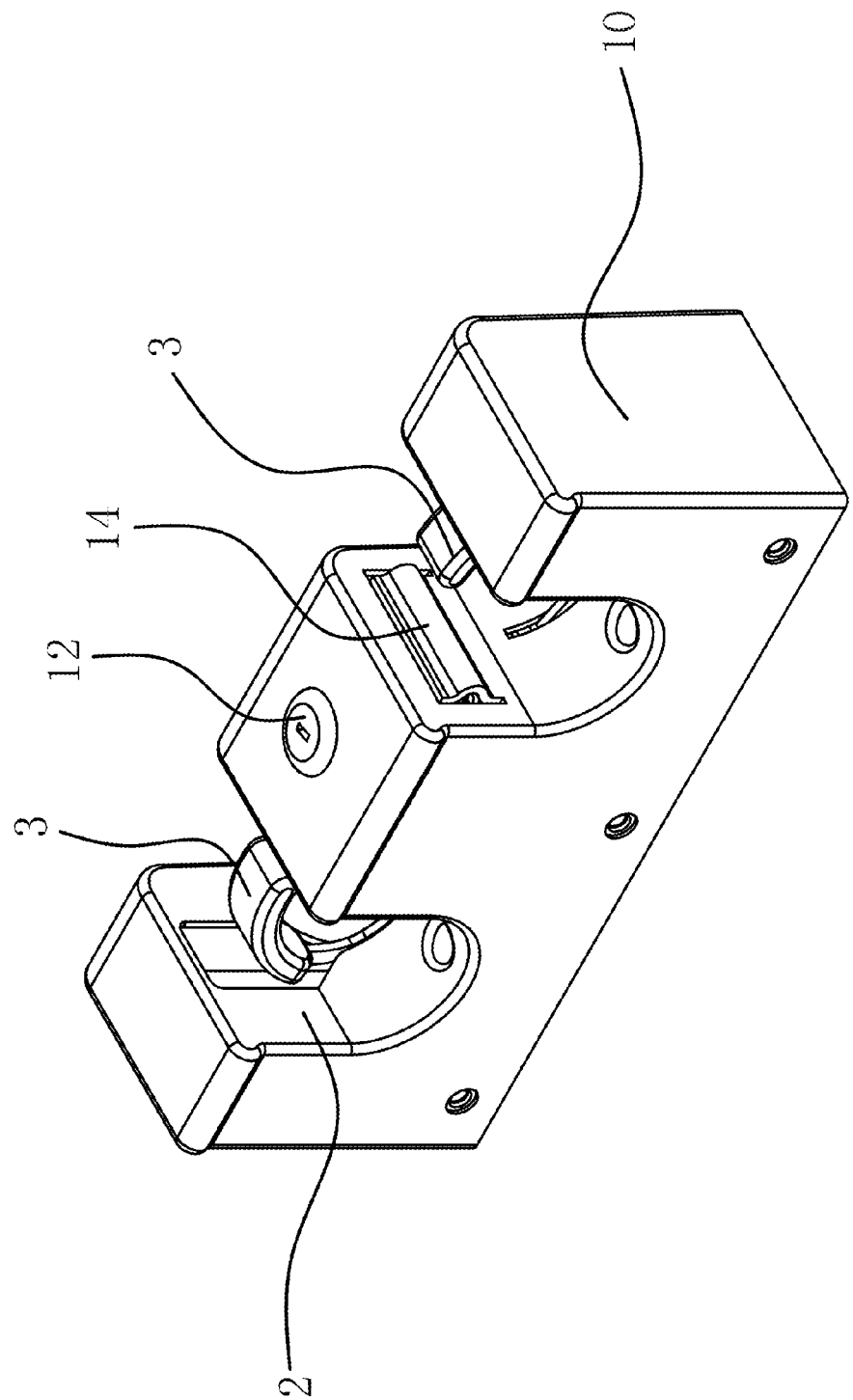
FIG. 1 is a stereogram of the device for fixing rod-like apparatus of the invention.

As shown in FIG. 1, a device for fixing a rod-like apparatus includes a body 1 having a cavity in the interior and one or more notches 2 having recessions on the body 1.

Figure 2:
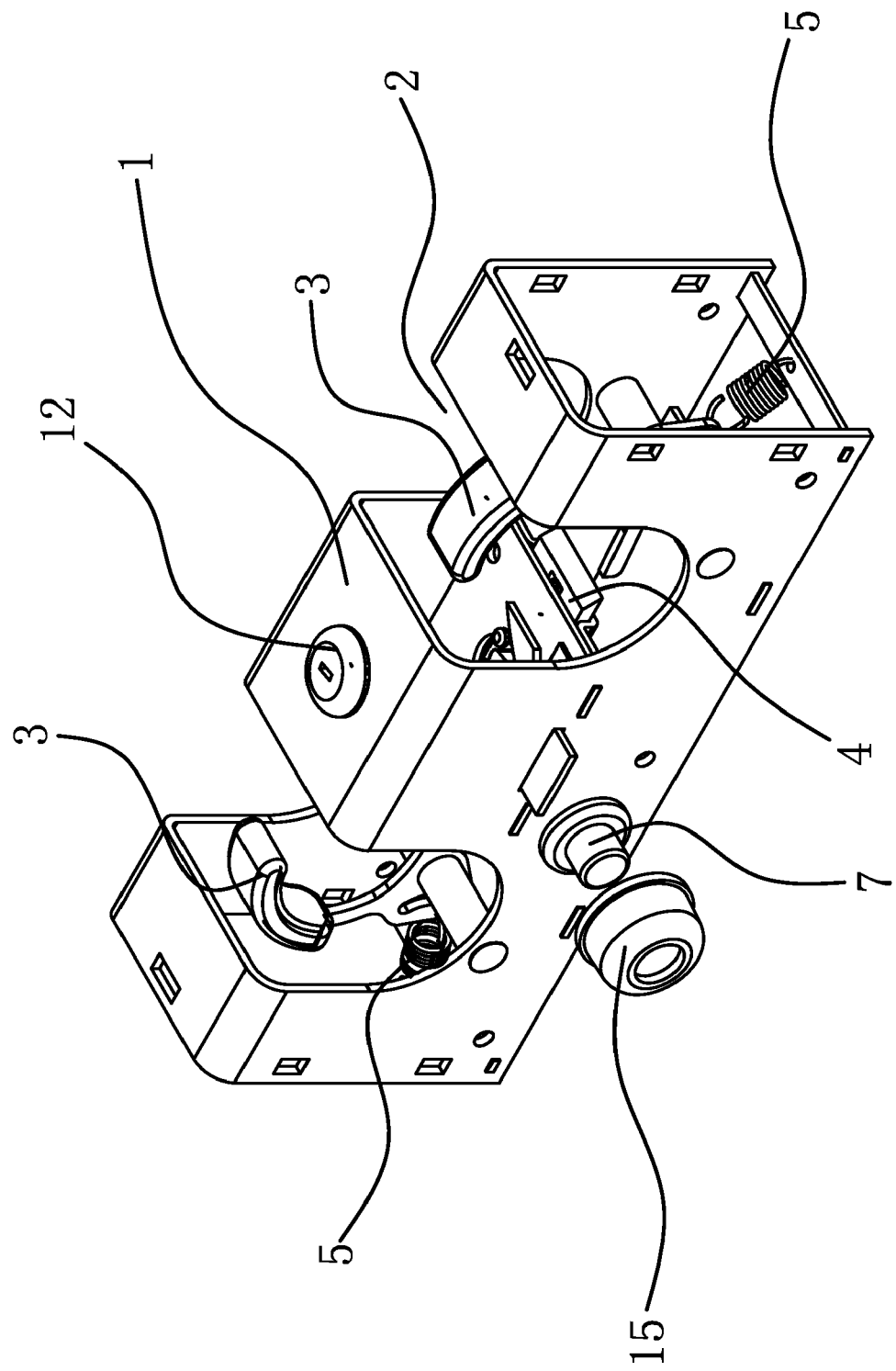
FIG. 2 is a structural diagram of the body of the device for fixing the rod-like apparatus of the invention.

In FIGS. 1 and 2, one or more holding pawls 3 are hinged into the body 1, which are arc-shaped and hinged to the body 1 at the middle portion thereof. The inner ends of the holding pawls 3 are located at the bottoms of the notches 2, while the outer ends of the holding pawls 3 are located on the side of the access ends of the notches 2.

Figure 3:
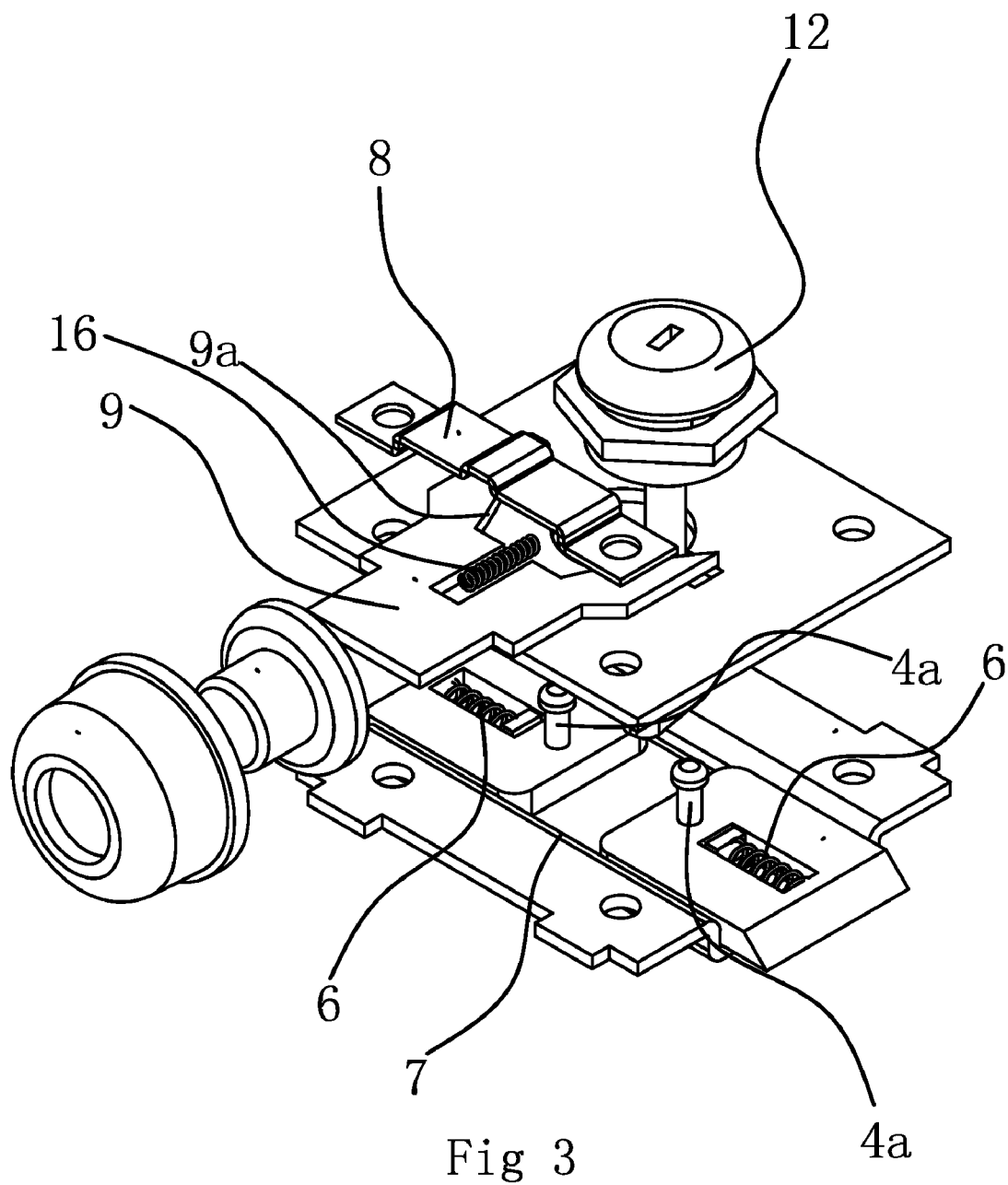
FIG. 3 is a structural diagram of the open piece of the device for fixing the rod-like apparatus of the invention.
Figure 4:
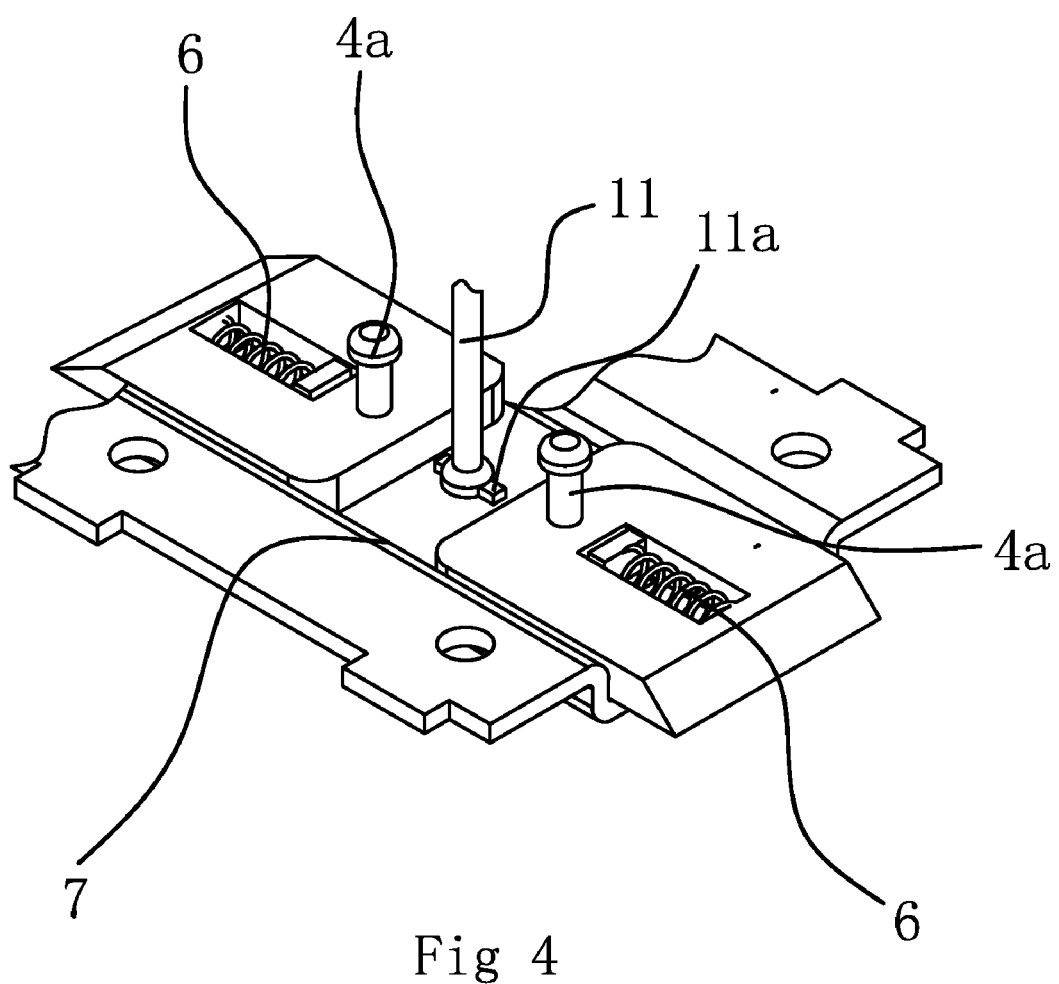
FIG. 4 is a structural diagram of the baffles of the device for fixing the rod-like apparatus of the invention.

As shown FIGS. 3 and 4, one or more positioning mechanisms are further provided in the body 1, through which the holding pawls 3 could be locked. The positioning mechanisms include one or more baffles 4, first springs 5 and second springs 6.

A guide element 7 is located in the body 1. The baffles 4 are connected to the guide element 7 and could move along the guide element 7. Both ends of the second springs 6 are acted against the guide element 7 and the baffles 4 respectively. That is to say, the baffles 4 are extended with the elasticity of the second spring 6. In this embodiment, the extended outer ends of the baffles 4 are inclined planes.

Both ends of the first springs 5 are pressed against the holding pawls 3 and the body 1 respectively. The inner ends of the holding pawls 3 are located on the upper portion of the baffles 4 with the elasticity of the first springs 5.

In said embodiment, two notches 2 are provided on the body 1. Each of the notches 2 has a holding pawl 3 and a positioning mechanism, in which the holding pawls 3 and the positioning mechanism are symmetrically disposed.

The baffles 4 have one or more projected plugs 4a. An open guide element 8 is provided in the body 1. In this embodiment, the open guide element 8 is fixedly connected to the upper part of the guide element 7. A through hole is formed between the open guide element 8 and the guide element 7. An open piece 9 is formed to move along the through hole. The open piece 9 is Y-shaped and has inclined extrusion faces 9a on both inner sides at the divergence. The plugs 4a of the above-mentioned two baffles are in contact with said two extrusion faces 9a of the open piece 9. According to this embodiment, a button 15 is covered on the outer end of the open piece 9, which is pressed during operation.

Furthermore, a return spring 16 is provided between the open piece 9 and the open guide element 8. The open piece 9 could be reset via the return spring after the button 15 is pressed.

A housing 10 made of plastics is located outside the body 1 to provide an aesthetic appearance and compact configuration.

In addition, in order to enhance the security of the device of the invention, a locking bar 11 is further provided on the body 1. The inner end of the locking bar 11 is positioned between said two baffles 4. The locking bar 11 has raised heads 11a projected from both sides thereof on the inner end. The raised heads 11a are located between said two baffles 4. The outer end of the locking bar 11 extends out of the housing 10. A locking instrument 12 is set at the outer end of the locking bar 11. The locking bar 11 could not be rotated unless the matched key is inserted into the locking instrument 12.

In the initial state of the device of the invention, said two baffles 4 partially extend to the bottoms of the notches 2 through the elasticity of the second springs 6. The inner ends of the holding pawls 3 are located on the baffles 4 with the elasticity of the first springs 5, and the outer ends of the holding pawls 3 are located on the side of the access ends of the notches 2.

The rod parts of the goods supporting means are inserted into the notches 2 when the rod-like apparatus including the goods supporting means are required to be fixed. The inner ends of the holding pawls 3 are extruded by the goods supporting means, so that the inner ends of the holding pawls 3 are swung from the upper parts of the baffles 4 to the lower parts of the baffles 4 by overcoming the elasticity of the first springs 5 and the second springs 6. The holding pawls 3 swung to the lower parts of the baffles 4 are detached from the baffles 4 when the holding pawls are swung to a certain extent. The baffles 4 extend out with the elasticity of the second springs 6. The inner ends of the holding pawls 3 are pressed against the lower parts of the baffles 4 with the elasticity of the first springs 5, while the outer ends of the holding pawls 3 are swung to the ends of the notes 2. In this case, the holding pawls 3 could not be moved. That is to say, the notches 2 of the body 1 are closed. Therefore, the goods supporting means at the notches 2 are firmly clamped.

Said two notches 2 on the device of the invention could be used to position two goods supporting means. In addition, the above two baffles 4 are so pressed against the raised heads 11a of the locking bar 11 that the baffles 4 would not be drawn back even under the external force. s When the goods supporting means need be removed from the notches 2 of the body 1, the key is inserted into the locking instrument 12 and the locking bar 11 is rotated, so that the raised heads 11a on the inner end of the locking bar 11 are rotated. In this connection, the baffles 4 are not blocked by the raised heads 11a. Thereafter, the open piece 9 is pressed and moves along the open guide element 8 to push the plugs 4a via the extrusion faces 9a, thereby bringing said two baffles 4 overcome the elasticity of the second springs and draw back.

Moreover, a protruded collar 14 is fixedly connected to the part of each notch 2 of the body opposite to the outer ends of the holding pawls 3. The rod-like apparatus could be relatively reliably positioned by matching the collars 14 with the holding paws 13.

Second Embodiment

Figure 5:
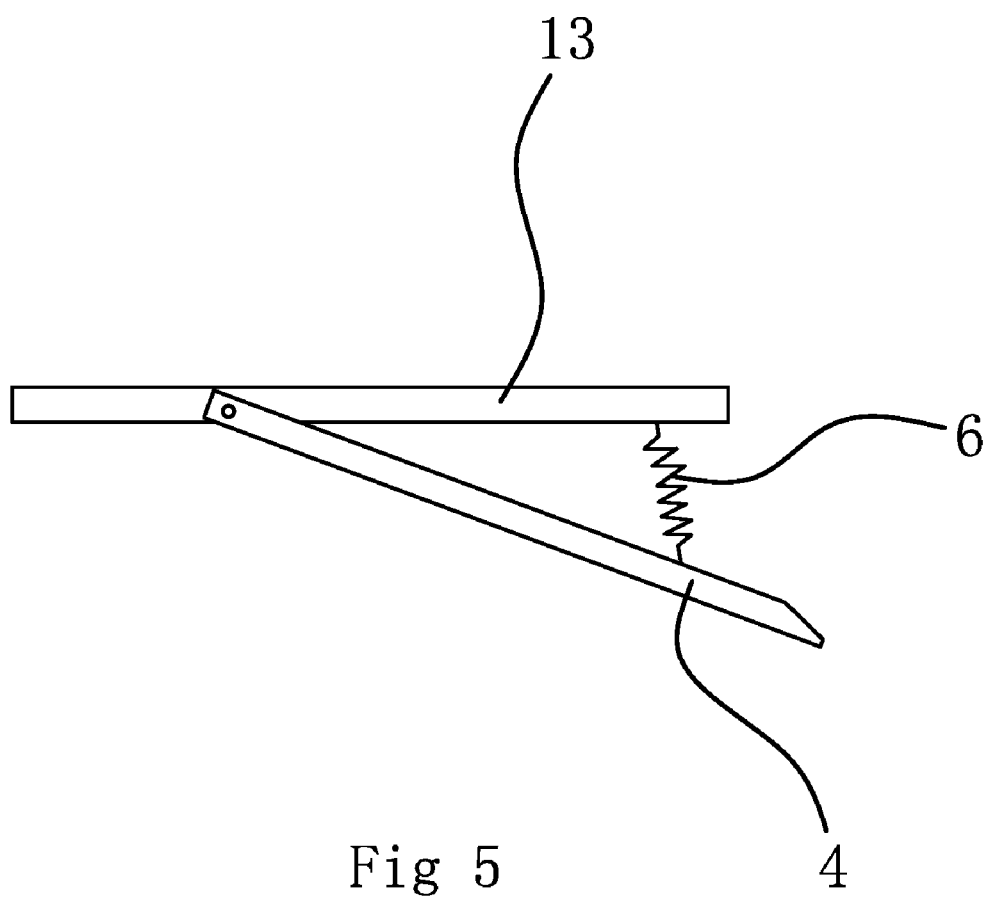
FIG. 5 is a structural diagram of the baffle of the second embodiment.

The structure and principle of said embodiment is substantially identical to those of the first embodiment with the exception that the body 1 has one or more corresponding positioning pieces 13 positioned therein the lower parts of which are hinged to one end of the baffles 4, and both ends of the second spring 6 are acted against the other ends of the positioning pieces 13 and the baffles 4, as shown in FIG. 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as body 1, notch 2, holding pawl 3, baffle 4, plug 4a, first spring 5, second spring 6, guide element 7, open guide element 8, open piece 9, extrusion face 9a, housing 10, locking bar 11, raised head 11a, locking instrument 12, positioning piece 13, collar 14, button 15 and return spring 16, the other similar terms could also be used. These terms are merely used to describe and explain the essence of the invention more conveniently, and any limitation to said terms is regarded as departing from the spirit of the invention.

LIST OF REFERENCE NUMERALS 1 body
2 notch
3 holding pawl
4 baffle
4a plug
5 first spring
6 second spring
7 guide element
8 open guide element
9 open piece
9a extrusion face
10 housing
11 locking bar
11a raised head
12 locking instrument
13 positioning piece
14 collar
15 button
16 return spring

What is claimed is:

1. A device for fixing a rod-like apparatus, comprising a body having a cavity in its interior, with one or more notches having recessions provided on the body, the notches having one or more holding pawls that are capable of opening and closing at ends thereof;

and one or more positioning mechanisms provided in the body that is capable of locking the holding pawls, in particular, locking the holding pawls when the notches of the body are closed by the holding pawls, wherein the holding pawls are arc-shaped and hinged to the body at a middle portion thereof, inner ends of the holding pawls are located at bottoms of the notches, and outer ends of the holding pawls are located on a side of access ends of the notches;

with said positioning mechanisms including one or more first springs and baffles movable in the body, both ends of the first springs pressing against the holding pawls and the body respectively, wherein the inner ends of the holding pawls are located on an upper portion of the baffles with the elasticity of the first springs;

wherein the baffles have projected plugs thereon, an open guide element is provided in the body, an open piece is provided at the open guide element to move along it, and the open piece has inclined extrusion faces which are in contact with the plugs.

2. A device for fixing a rod-like apparatus, comprising a body having a cavity in its interior, with one or more notches having recessions provided on the body, the notches having one or more holding pawls that are capable of opening and closing at ends thereof;

and one or more positioning mechanisms provided in the body that is capable of locking the holding pawls, in particular, locking the holding pawls when the notches of the body are closed by the holding pawls, wherein the holding pawls are arc-shaped and hinged to the body at a middle portion thereof, inner ends of the holding pawls are located at bottoms of the notches, and outer ends of the holding pawls are located on a side of access ends of the notches;

with said positioning mechanisms including one or more first springs and baffles movable in the body, both ends of the first springs pressing against the holding pawls and the body respectively, wherein the inner ends of the holding pawls are located on an upper portion of the baffles with the elasticity of the first springs;

the positioning mechanisms further including one or more second springs provided between the baffles and the body, and the baffles partially extending to the notches with the elasticity of the second springs;

wherein the baffles have projected plugs thereon, an open guide element is provided in the body, an open piece is provided at the open guide element to move along it, and the open piece has inclined extrusion faces which are in contact with the plugs.

3. A device for fixing a rod-like apparatus, comprising a body having a cavity in its interior, with one or more notches having recessions provided on the body, the notches having one or more holding pawls that are capable of opening and closing at ends thereof;

and one or more positioning mechanisms provided in the body that is capable of locking the holding pawls, in particular, locking the holding pawls when the notches of the body are closed by the holding pawls, wherein the holding pawls are arc-shaped and hinged to the body at a middle portion thereof, inner ends of the holding pawls are located at bottoms of the notches, and outer ends of the holding pawls are located on a side of access ends of the notches;

with said positioning mechanisms including one or more first springs and baffles movable in the body, both ends of the first springs pressing against the holding pawls and the body respectively, wherein the inner ends of the holding pawls are located on an upper portion of the baffles with the elasticity of the first springs;

the positioning mechanisms further including one or more second springs provided between the baffles and the body, and the baffles partially extending to the notches with the elasticity of the second springs;

and a guide element located in the body, wherein the baffles are connected to the guide element and is capable of moving along the guide element, and both ends of the second springs are acted against the guide element and the baffles respectively;

wherein the baffles have projected plugs thereon, an open guide element is provided in the body, an open piece is provided at the open guide element to move along it, and the open piece has inclined extrusion faces which are in contact with the plugs.

4. The device as claimed in claim 1, characterized in that, two notches are provided on the body, each of the notches has the holding pawl and the positioning mechanism in which the holding pawls and the positioning mechanism are symmetrically disposed, the open piece is Y-shaped, and both inner ends of the Y-shaped open piece are in contact with the plugs on the baffles respectively.

5. The device as claimed in claim 2, characterized in that, two notches are provided on the body, each of the notches has the holding pawl and the positioning mechanism in which the holding pawls and the positioning mechanism are symmetrically disposed, the open piece is Y-shaped, and both inner ends of the Y-shaped open piece are in contact with the plugs on the baffles respectively.

6. The device as claimed in claim 3, characterized in that, two notches are provided on the body, each of the notches has the holding pawl and the positioning mechanism in which the holding pawls and the positioning mechanism are symmetrically disposed, the open piece is Y-shaped, and both inner ends of the Y-shaped open piece are in contact with the plugs on the baffles respectively.

7. The device as claimed in claim 1, characterized in that, a locking bar is further provided on the body, an inner end of the locking bar is positioned between said two baffles, the locking bar has projected raised heads at the inner end thereof, and an outer end of the locking bar extends out of the housing.

8. The device as claimed in claim 2, characterized in that, a locking bar is further provided on the body, an inner end of the locking bar is positioned between said two baffles, the locking bar has projected raised heads at the inner end thereof, and an outer end of the locking bar extends out of the housing.

9. The device as claimed in claim 3, characterized in that, a locking bar is further provided on the body, an inner end of the locking bar is positioned between said two baffles, the locking bar has projected raised heads at the inner end thereof, and an outer end of the locking bar extends out of the housing.

* * * * *